United States Patent
Kim et al.

(10) Patent No.: US 8,506,152 B2
(45) Date of Patent: Aug. 13, 2013

(54) LIGHT GUIDE PLATE AND DISPLAY APPARATUS HAVING THE SAME

(75) Inventors: Youngchan Kim, Suwon-si (KR); Moongyu Lee, Suwon-si (KR); Jeehong Min, Seongnam-si (KR); Hyundeok Im, Seoul (KR)

(73) Assignee: Samsung Display Co., Ltd. (KR)

( * ) Notice: Subject to any disclaimer, the term of this patent is extended or adjusted under 35 U.S.C. 154(b) by 440 days.

(21) Appl. No.: 12/830,211

(22) Filed: Jul. 2, 2010

(65) Prior Publication Data

US 2011/0013416 A1 Jan. 20, 2011

(30) Foreign Application Priority Data

Jul. 20, 2009 (KR) .................. 10-2009-0065963

(51) Int. Cl.
*F21V 8/00* (2006.01)
*G02B 6/42* (2006.01)

(52) U.S. Cl.
USPC ........... 362/617; 362/621; 362/628; 362/615; 362/610; 349/65

(58) Field of Classification Search
USPC ............ 362/610, 615–629; 349/62–71
See application file for complete search history.

(56) References Cited

U.S. PATENT DOCUMENTS

| 8,089,582 B2 * | 1/2012 | Sekiguchi et al. | 362/616 |
| 8,111,354 B2 * | 2/2012 | Ouchi et al. | 349/65 |
| 2008/0030650 A1 * | 2/2008 | Kitagawa et al. | 362/612 |
| 2010/0214331 A1 * | 8/2010 | Pyun et al. | 362/612 |
| 2010/0328362 A1 * | 12/2010 | Song | 362/615 |

FOREIGN PATENT DOCUMENTS

| JP | 2001-092370 | | 4/2001 |
| JP | 2007-227074 | | 9/2007 |
| JP | 2007-265689 | | 10/2007 |
| JP | 2009031445 A | * | 2/2009 |
| JP | 2010040351 A | * | 2/2010 |
| KR | 1020020013790 A | | 2/2002 |
| KR | 1020030038294 A | | 5/2003 |
| KR | 1020080058518 A | | 6/2008 |
| TW | 200513692 A | * | 4/2005 |

* cited by examiner

*Primary Examiner* — Mariceli Santiago
(74) *Attorney, Agent, or Firm* — Innovation Counsel LLP

(57) ABSTRACT

A light guide plate includes at least one incident surface into which light is incident, an exit surface at least one end of which is connected the incident surface and through which the light is output, an opposite surface spaced apart from the exit surface and opposing the exit surface, and a plurality of reflective patterns extending from the exit surface toward the opposite surface. When a direction from the exit surface to the opposite surface is referred to as a first direction, a direction perpendicular to the incident surface is referred to as a second direction, and a direction parallel to the incident surface and perpendicular to the first direction is referred to as a third direction, a length of each reflective pattern in the first direction is smaller than a distance between the exit surface and the opposite surface, and a length of each reflective pattern in the second direction is larger than a length of each reflective pattern in the third direction.

19 Claims, 18 Drawing Sheets

LIGHT GUIDE PLATE AND DISPLAY APPARATUS HAVING THE SAME

CROSS-REFERENCE TO RELATED APPLICATION

This application relies for priority upon Korean Patent Application No. 2009-65963 filed on Jul. 20, 2009, the contents of which are herein incorporated by reference in their entirety.

BACKGROUND OF THE INVENTION

1. Field of the Invention

The present invention relates to a light guide plate and a display apparatus having the same. More particularly, the present invention relates to a light guide plate capable of improving display quality and a display apparatus having the same.

2. Description of the Related Art

A display apparatus, such as a liquid crystal display (LCD) or an electrophoretic display, includes an LCD panel or an electrophoretic display panel which display images. Because the LCD panel or the electrophoretic display panel do not emit light, a backlight light unit is necessary to provide light to the display panel.

The backlight unit can be classified into either an edge-illumination type backlight unit or a direct-illumination type backlight unit depending upon the position of the light source in the unit. In the direct-illumination type backlight unit, the light source is provided direct-rearward of the display panel. In the edge-illumination type backlight unit, the light source is provided on one side below the display panel.

The backlight unit includes a light guide plate in order to efficiently supply light from the light source to the display panel. The light guide plate guides the light from the light source into the display panel. Because a linear light source or a point light source is generally used as the light source, a light guide plate that can efficiently guide the light from the light source to the display panel so as to reduce power consumption of the backlight unit without degrading display quality is required.

SUMMARY OF THE INVENTION

An exemplary embodiment provides a light guide plate having a dimming function capable of not only improving display quality but also reducing power consumption.

Another exemplary embodiment provides a display apparatus including such a light guide plate.

In one aspect, a light guide plate includes at least one incident surface into which light is incident, an exit surface at least one end of which is connected to the incident surface and through which the light is output, an opposite surface spaced apart from the exit surface and opposing the exit surface, and a plurality of reflective patterns, each extending from the exit surface toward the opposite surface. Assuming that a direction from the exit surface to the opposite surface is referred to as a first direction, a direction perpendicular to the incident surface is referred to as a second direction, and a direction parallel to the incident surface and perpendicular to the first direction is referred to as a third direction, a length of each reflective pattern in the first direction is smaller than a distance between the exit surface and the opposite surface, and a length of each reflective pattern in the second direction is larger than a length of each reflective pattern in the third direction.

The exit surface includes a plurality of regions extending in the second direction, and a plurality of reflective sections interposed between the regions. The reflective patterns are formed on at least one of the reflective sections. A length of each region in the third direction is smaller than the length of each reflective pattern in the first direction.

When each reflective pattern is sectioned along a plane parallel to the exit surface, the reflective pattern has a sectional shape of a rhombus, a lozenge, an oval or a rectangle.

The length of each reflective pattern in the second direction is gradually reduced along the first direction.

The length of each reflective pattern in the first direction is about 10% to about 80% relative to the distance between the exit surface and the opposite surface.

The light guide plate is divided into a plurality of sub-regions and the number of the reflective patterns in one sub-region is different from the number of the reflective patterns in at least one of the rest of the sub-regions.

In another aspect, a display apparatus that includes the light guide plate is provided. The display apparatus includes a display panel, a plurality of light sources, and the light guide plate provided between the display panel and the light sources. The light guide plate guides light emitted from the light sources to the display panel.

The light sources are disposed adjacent to the incident surface and face the incident surface.

In one aspect, two incident surfaces are provided on two sides of the light guide plate and the two sides are facing each other, and both ends of the exit surface are connected to the two incident surfaces, respectively. The exit surface includes a plurality of regions extending in the second direction, and a plurality of reflective sections interposed between the regions. The reflective patterns are formed on at least one of the reflective sections. The number of the regions is equal to, or more than, the number of the light sources. When the number of the regions is equal to the number of the light sources, the light sources are in one-to-one correspondence with the regions.

According to the present invention, the linearity of light incident into the light guide plate is improved, so that the light guide plate may advantageously achieve local dimming, which is a technique that is used to change brightness of some regions from among a plurality of regions. In addition, defects such as bright lines are reduced in the light guide plate when performing the local dimming technique. Therefore, display quality of the display apparatus including the light guide plate is improved.

BRIEF DESCRIPTION OF THE DRAWINGS

The above and other advantages of the present invention will become readily apparent by reference to the following detailed description when considered in conjunction with the accompanying drawings wherein:

FIG. 13A is a view showing light distribution when using a light guide plate according to an embodiment when only some of a plurality of light sources are turned on;

FIG. 13B is a view showing light distribution of a light guide plate used in FIG. 13A when all light sources are turned on;

FIG. 14A is a view showing light distribution of a light guide plate according to an embodiment when only some of a plurality of light sources are turned on;

FIG. 14B is a view showing light distribution of a light guide plate used in FIG. 14A when all light sources are turned on.

DESCRIPTION OF THE EMBODIMENTS

Figure 1:
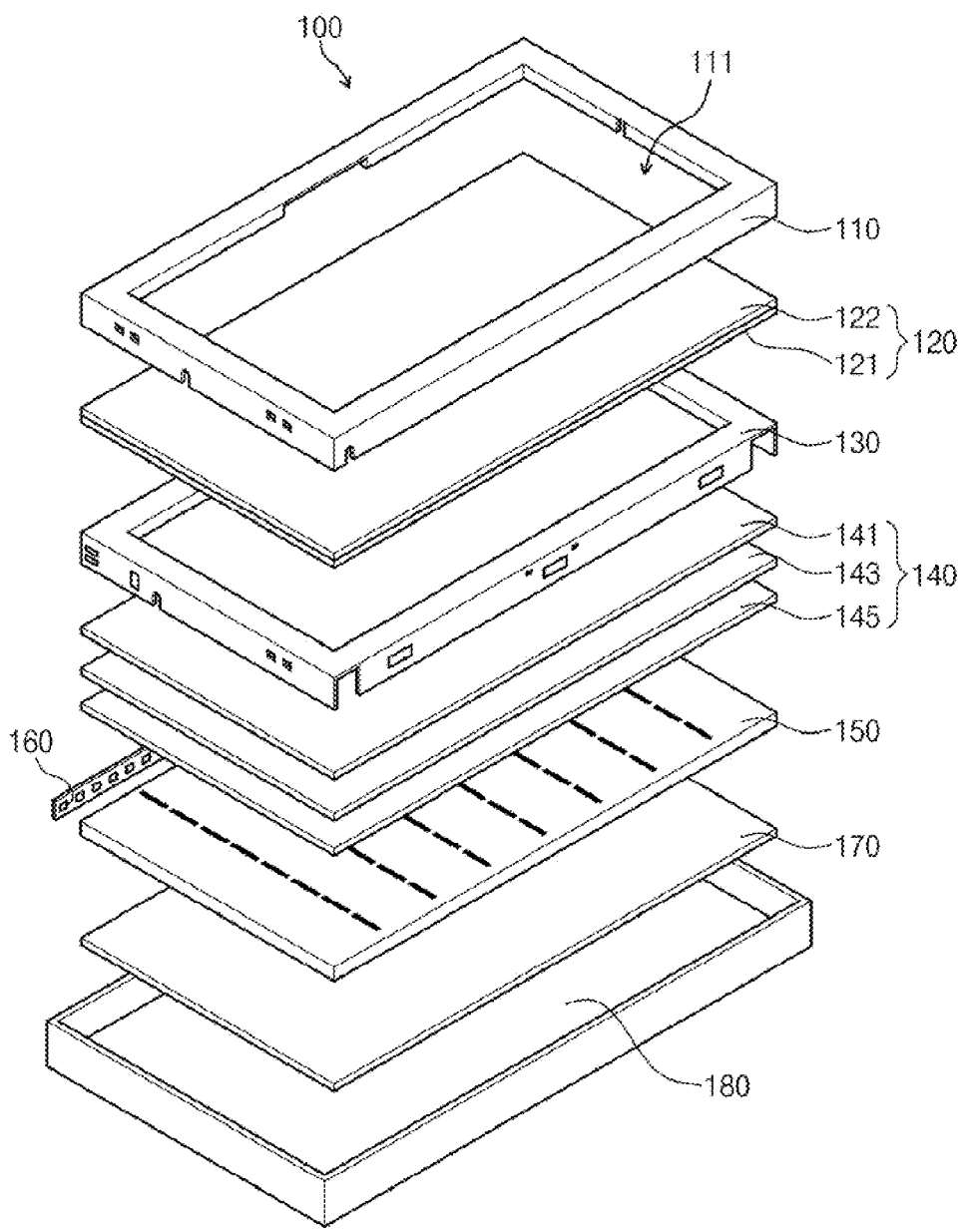
FIG. 1 is an exploded perspective view showing a display apparatus.

Hereinafter, a light guide plate and a display apparatus having the same according to the embodiments will be described with reference to the accompanying drawings.

It should be understood that the present invention is not limited to appended drawings but includes all modifications, equivalents and alternatives within the spirit and scope of the following claims. The scales of some elements are reduced or exaggerated to clearly express various layers and regions. In addition, the same reference numerals are used to designate the same elements throughout the drawings. For the purpose of explanation, a portion of a display panel on which an image is displayed will be referred to as an upper portion or a front portion, and a portion opposite to the upper portion or the front portion will be referred to as a lower portion or a rear portion.

FIG. 1 is an exploded perspective view showing a display apparatus according to an embodiment.

Referring to FIG. 1, the display apparatus 100 includes a display panel 120 that displays an image on a front surface thereof.

A mold frame 130 is provided along peripheral portions of the display panel 120 to support the display panel 120. An optical sheet unit 140 and a light guide plate 150 are sequentially provided behind the display panel 120. A plurality of light sources 160 are provided at a side of the light guide plate 150 to supply light to the display panel 120 through the light guide plate 150.

An element supplying light to the display panel 120 is referred to as a backlight unit, and the backlight unit includes the light sources 160 and the light guide plate 150.

The present embodiment employs an edge-illumination type backlight unit in which the light sources 160 are placed at a side of the light guide plate 150.

A reflective sheet 170 is provided below the light sources 160 to reflect light, which is not directed to the display panel 120, toward the display panel 120.

A lower cover 180 is provided below the reflective sheet 170 to receive the display panel 120, the light guide plate 150, the light sources 160, and the reflective sheet 170. An upper cover 110 is provided above the display panel 120 such that the upper cover 110 is coupled with the lower cover 180. The upper cover 110 supports a front peripheral surface of the display panel 120. The upper cover 110 includes a display window 111 to expose a display region of the display panel 120.

Various display panels may be employed to display an image. For example, the display panels may include an LCD panel or an electrophoretic display panel. According to the present embodiment, an LCD panel is employed.

The display panel 120 is a rectangular plate. The display panel 120 includes a first substrate 121, a second substrate 122 facing the first substrate 121, and a liquid crystal layer (not shown) interposed between the first substrate 121 and the second substrate 122. The display panel 120 drives the liquid crystal to display an image on the front portion of the display panel 120.

The mold frame 130 is provided along peripheral portions of the display panel 120. The mold frame 130 has a substantially rectangular loop shape. The mold frame 130 supports the display panel 120 and the light guide plate 150. The mold frame 130 is assembled with the lower cover 180 to receive the light guide plate 150, the light sources 160, and the reflective sheet 170 therein. As shown in FIG. 1, a single mold frame 130 is provided. Alternatively, a plurality of mold frames 130 may be provided and assembled with each other.

The light guide plate 150 guides the light provided by the light sources 160 toward the display panel 120, as will be described in more detail below.

The optical sheet unit 140 is provided between the light guide plate 150 and the display panel 120 to adjust the light emitted from the light sources 160. The optical sheet unit 140 includes a protective sheet 141, a prism sheet 143 and a diffusion sheet 145.

The diffusion sheet 145 diffuses the light. The prism sheet 143 focuses light diffused by the diffusion plate 145 such that the direction of the light is perpendicular to a surface of the display panel 120. Most light that has passed through the prism sheet 143 travels perpendicularly to the surface of the display panel 120 so that a uniform brightness distribution of the light is achieved. The protective sheet 141, which is placed at the uppermost portion of the optical sheet unit 140, protects the prism sheet 143 from scratches. The protective sheet 141, the prism sheet 143 and the diffusion sheet 145 may be omitted. Alternatively, a plurality of prism sheets 143 and diffusion sheets 145 may be provided which overlap each other. Furthermore, additional optical sheets, such as brightness enhancement films, may be included.

A plurality of light sources 160 are provided at the side of the light guide plate 150 such that the light is supplied to the display panel 120 through the light guide plate 150. The light sources 160 may include, for example, a light emitting diode (LED), a cold cathode fluorescence lamp (CCFL), an external electrode fluorescent lamp (EEFL), or a hot cathode fluorescence lamp (HCFL).

The reflective sheet 170 is provided below the light sources 160. The reflective sheet 170 reflects light, which travels downward from the light sources 160, toward the display panel 120.

As described above, when the display panel 120 is a non-emissive display such as a liquid crystal display panel, the light sources 160 are additionally employed to supply light. In this case, the light sources 160 are provided at one side below the display panel 120, so the light guide plate 150 is used to guide the light toward the display panel 120.

Figure 2:
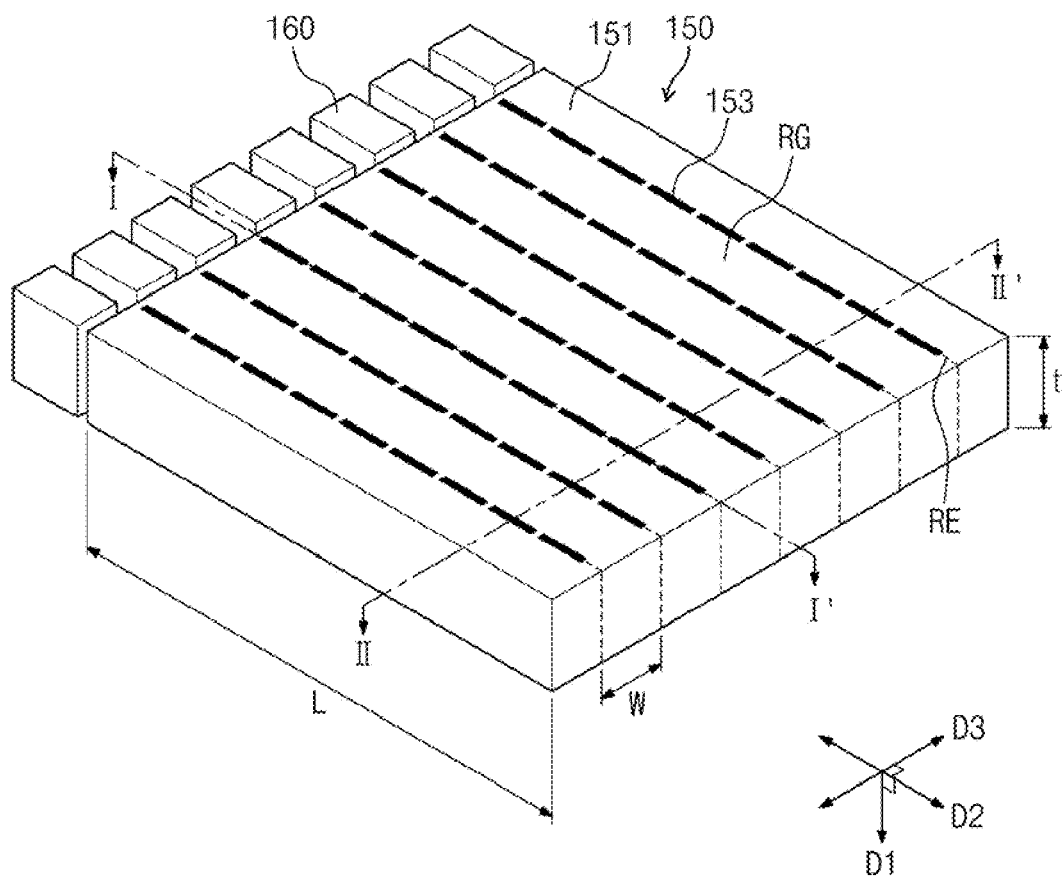
FIG. 2 is a perspective view showing a light guide plate according to a first embodiment.
Figure 3A:
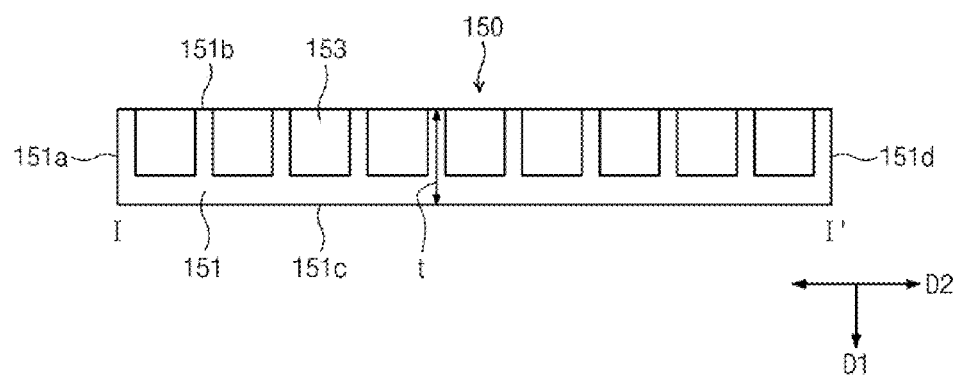
FIG. 3A is a sectional view taken along line I-I' shown in FIG. 2.

FIG. 2 is a perspective view showing the light guide plate according to a first embodiment, in which the light sources and the light guide plate of the display apparatus shown in FIG. 1 are separately illustrated. FIG. 3A is a sectional view taken along line I-I' shown in FIG. 2, and FIG. 3B is a sectional view taken along line II-II' shown in FIG. 2.

Figure 3B:
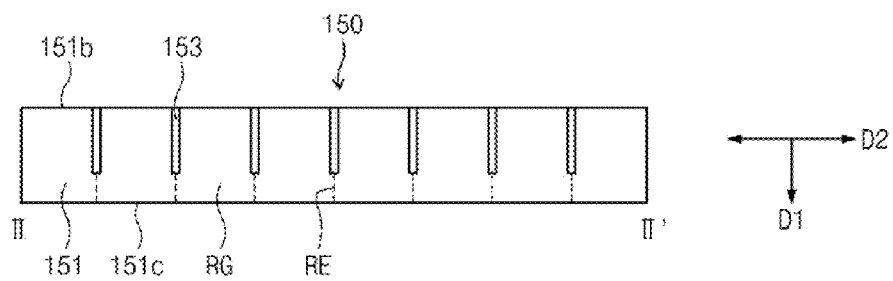
FIG. 3B is a sectional view taken along line II-II' shown in FIG. 2.

Referring to FIGS. 2, 3A and 3B, the light guide plate 150 according to a first embodiment includes a body 151 having a plate shape and a plurality of reflective patterns 153 formed on the body 151.

The body 151 includes an incident surface 151a, an exit surface 151b and an opposite surface 151c. The exit surface 151b and the opposite surface 151c serve as top and bottom surfaces, respectively, of the body 151 having the plate shape. Thus, a distance between the exit surface 151b and the opposite surface 151c corresponds to a thickness t of the light guide plate 150.

Figure 4:
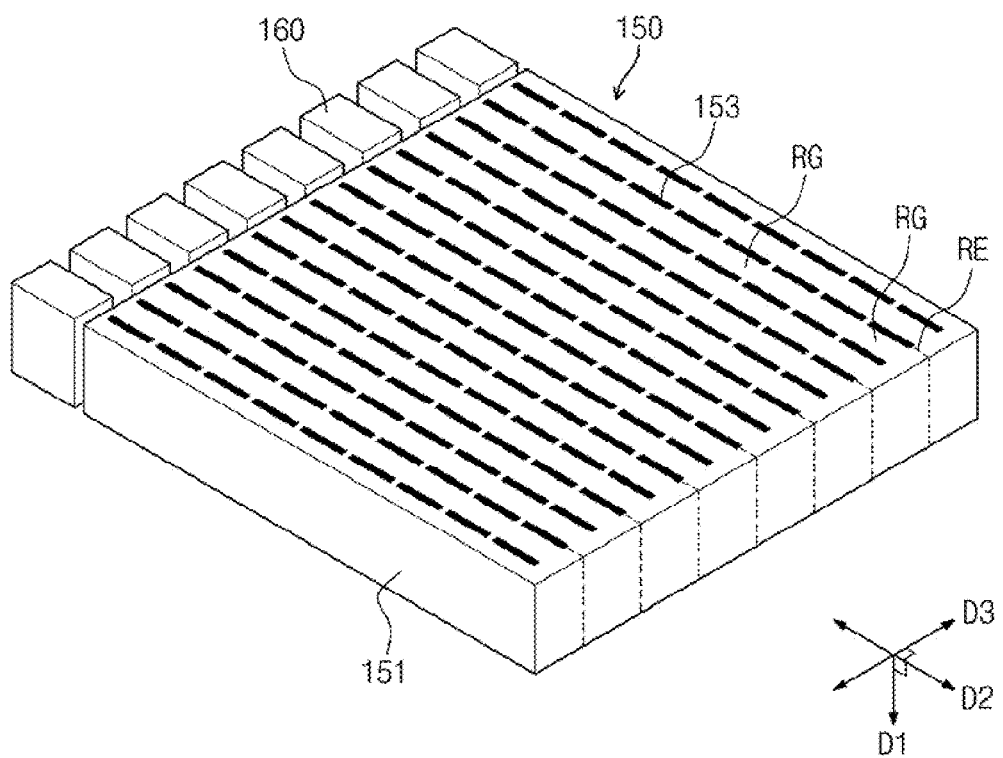
FIG. 4 is a perspective view showing a light guide plate according to a second embodiment.

The body 151 is divided, FIG. 3B and FIG. 4, into a plurality of regions RG each extending in a direction perpendicular to the incident surface 151a, and a plurality of reflective sections RE, which are interposed between the regions RG and thus also extend in a direction perpendicular to the incident surface 151a. The light emitted from the light sources 160 is incident onto the incident surface 151a and travels through the incident surface 151a in the longitudinal direction of the regions RG. The light sources 160 are provided in one-to-one correspondence with the regions RG, to supply light to each region RG. Each light source 160 is turned on/off in response to power supplied from outside the light source, to supply light to each region RG. According to a first embodiment, eight regions RG (first to eighth regions) are provided in the body 151 and eight light sources 160 are provided for each of the eight regions RG. However, the number of regions RG and light sources 160 may be less or more than eight. The number of light sources, and hence regions RG that are used, is calculated based on the number of light sources which are individually driven. If a plurality of lamps are driven simultaneously, the lamps may be regarded as one light source 160.

The incident surface 151a is adjacent to the light sources 160 to receive light from the light sources 160. The incident surface 151a is perpendicular to the travelling direction of the light emitted from the light sources 160 such that the light is incident into the incident surface 151a as much as possible. Thus the light sources 160 face the incident surface 151a.

The incident light that enters the light guide plate 150 is output through the exit surface 151b. One end of the exit surface 151b is connected to the incident surface 151a. The exit surface 151b may be connected to the incident surface 151a so that a right angle is formed by the exit surface 151b and the incident surface 151a. Alternatively, the exit surface 151b may be connected to the incident surface 151a at various other angles.

The opposite surface 151c is opposite to the exit surface 151b. One end of the opposite surface 151c is connected to the incident surface 151a. The opposite surface 151c may be perpendicular to the incident surface 151a. If the exit surface 151b is also perpendicular to the incident surface 151a, the opposite surface 151c is parallel to the exit surface 151b.

The reflective patterns 153 are formed in the reflective sections RE between adjacent regions RG. Each reflective pattern 153 extends from the exit surface 151b toward the opposite surface 151c or from the opposite surface 151c toward the exit surface 151b to reflect the incident light. If the light guide plate 150 has a mirror surface, total reflection of the light may occur on the mirror surface so that an additional reflective member is not necessary in the reflective patterns 153. However, the reflective patterns 153 may include reflective material, if necessary, to enhance a reflection of the incident light.

The reflective patterns 153 allow the light incident into each region RG to travel in the longitudinal direction of the regions RG. To this end, each reflective pattern 153 has directionality such that the light incident through the incident surface 151a is prevented from diffusing in the lateral direction.

Hereinafter, for the purpose of convenience of explanation, a direction from the exit surface 151b to the opposite surface 151c will be referred to as a first direction D1, a direction perpendicular to the incident surface 151a will be referred to as a second direction D2, and a direction parallel to the incident surface 151a and perpendicular to the first direction D1 will be referred to as a third direction D3. The reflective patterns 153 typically extend from the exit surface 151b toward the opposite surface 151c, that is, the reflective patterns 153 extend in the first direction D1. If, instead, the reflective patterns 153 extend from the opposite surface 151c toward the exit surface 151b, the shape of the reflective patterns 153 may remain unchanged, but positions of the exit surface 151b and the opposite surface 151c are interchanged.

Each region RG extends in the second direction D2, and the reflective sections RE extending in the second direction D2 are interposed between adjacent regions RG. The reflective patterns 153 are provided in the reflective sections RE in a row. The total of the sum of the lengths of each of the reflective patterns 153 formed in each reflective section RE is about 50% or more relative to the length L of each region RG in the second direction D2.

The reflective patterns 153 are aligned discontinuously in a row in the second direction D2. The discontinuity of the reflective patterns 153 allows the light to travel between adjacent regions RG. If the reflective patterns 153 provided in the reflective section RE have a total length that is the same as the length L of the light guide plate 150 in the second direction D2, light diffusion between adjacent regions RG may not occur. That is, once light comes into one of the regions RG, because the light will be reflected by the reflective patterns 153, if the light cannot travel between adjacent regions RG, the light travels along only that one region RG. Thus, reflection may continuously occur in the reflective sections RE, which may increase the light quantity as compared with other regions RG, resulting in bright lines in the reflective sections RE. In order to reduce such bright lines, the reflective patterns 153 are discontinuously formed in the reflective sections RE. Thus, because a part of the light diffuses to the adjacent regions RG through portions where the reflective patterns 153 are not formed, the bright lines are reduced.

Each reflective pattern 153 has a length in the second direction D2, which is along the travelling direction of the incident light, and a width in the third direction D3. The length of each reflective pattern 153 in the second direction D2 is longer than the width of each reflective pattern 153 in the third direction D3.

When the reflective patterns 153 are sectioned along the plane parallel to the exit surface 151b, each reflective pattern 153 may have the sectional shape of a rhombus, including a lozenge, an oval or a rectangle, or a streamlined shape. The reflective patterns 153 may have various sectional shapes under the condition that the length of each individual reflective pattern 153 in the second direction D2 is longer than the width of the individual reflective pattern 153 in the third direction D3. According to a first embodiment, each reflective pattern 153 has a rectangular sectional shape when the reflective patterns 153 are sectioned along the plane parallel to the exit surface 151b. If the width of each reflective pattern 153 is enlarged in the third direction D3, light loss may occur in the region RG, so the width of each reflective pattern 153 may be made as narrow as possible, to reduce the light loss.

Each reflective pattern 153 extends from the exit surface 151b toward the opposite surface 151c, and the length of each reflective pattern 153 in the first direction D1 is smaller than the thickness t (as shown in FIG. 3A) of the light guide plate 150 that corresponds to the distance between the exit surface 151b and the opposite surface 151c.

Because the length of each reflective pattern 153 in the first direction D1 is smaller than the thickness t of the light guide plate 150, the light travels between the regions RG. If the length of each reflective pattern 153 in the first direction D1 is equal to the thickness t of the light guide plate 150, the plural regions RG are separated from each other and light diffusion may not occur between adjacent regions RG. That is, once the light is incident into one region RG, the light may travel along just one region RG while being reflected by the reflective patterns 153. Thus, reflection may continuously occur in the reflective section RE aligned between two adjacent regions RG, so that the quantity of light may be increase as compared with other regions RG, resulting in bright lines in corresponding reflective section RE and causing significant differences in the quantity of light between adjacent regions RG. Such differences in the quantity of the light may cause difference in the density of light after it has passed through the panel, so visibility of the light may be degraded. Therefore, the reflective patterns 153 are typically not formed on an area adjacent to the opposite surface 151c of the light guide plate 150 so that the light can partially diffuse to the adjacent regions RG, thereby preventing defects that may be caused by bright lines and differences in light density.

In other words, the quantity of light diffusing to the adjacent region RG is adjusted by controlling the length of the reflective patterns 153 in the first direction D1, that is, the depth of the reflective patterns 153. Typically, the length of each reflective pattern 153 in the first direction D1 may correspond to 10% to 80% of the distance between the exit surface 151b and the opposite surface 151c.

Superior characteristics may be obtained if the width w of the region RG becomes narrower in the third direction D3, so the width of the region RG is set to be smaller than the length of the region RG in the first and second directions, D1 and D2, respectively.

The reflective patterns 153 can be formed through various methods. According to one embodiment, the reflective patterns 153 are formed by using a laser. For instance, after preparing the light guide plate 150 which has no reflective patterns, the laser is irradiated onto the light guide plate 150 while moving the laser in the second direction D2 and the third direction D3, thereby forming the patterns. The size and depth of the patterns may be adjusted by controlling the size of laser beam, intensity of the laser, and the moving speed of the laser. Discontinuous patterns are obtained by periodically turning the laser on and off.

Hereinafter, the method of achieving local dimming using the light guide plate 150 will be described. The light sources 160 disposed adjacent to the light incident surface 151a of the light guide plate 150 are turned on. The light sources 160 may be individually driven and turned on/off to emit the light or not. Only the light sources 160 that are in an on state emit light, and that light is incident into the regions RG that correspond to those light sources 160 that are in an on state. The light is incident into the regions RG through the incident surface 151a of the light guide plate. The light incident through the incident surface 151a mainly travels along the region RG and then is output through the exit surface 151b. As a result, the regions RG corresponding to the light sources 160 that are in an on state output the light, so that those regions RG become bright, and the regions RG corresponding to the light sources 160 that are in an off state do not output the light, so that those regions RG become dark. Therefore, the local dimming is effectively achieved.

According to the first embodiment, the light sources 160 are provided at one side of the light guide plate 150. According to another embodiment, the light sources 160 are provided at both sides of the light guide plate 150. In such a case, the incident surface 151a of the first embodiment becomes a first incident surface, and an incident surface 151d opposite to the first incident surface becomes a second incident surface. The number of light sources 160 supplying light to the second incident surface 151d corresponds to the number of the regions RG of the light guide plate 150. If the first and second incident surfaces 151a and 151d are provided at both sides of the light guide plate 150, the quantity of light may be more variously adjusted by individually driving the light sources 160 supplying light to the regions RG, so that the bright adjustment between the dark regions RG and bright regions RG is easily achieved.

FIG. 4 is a perspective view showing a light guide plate according to the second embodiment. The second embodiment will be explained by describing the differences between first and second embodiments in order to avoid redundancy. The same reference numerals will be used to designate the same elements.

The light guide plate 150 according to the second embodiment includes a body 151 which is divided into a plurality of regions RG extending in the second direction D2 and a plurality of reflective sections RE interposed between the regions RG. Most of the light emitted from the light sources 160 is incident into the incident surface 151a and then travels in the longitudinal direction of the regions RG.

Each region RG has a width that is narrower than a width of the region RG according to the first embodiment. Thus, each light source 160 supplies light to at least one, but typically more than one, region RG. For instance, each light source 160 corresponds to two or three regions RG. Similar to the first embodiment, the light sources 160 corresponding to two or three regions RG are turned on and off in response to an input of external power to supply light to the regions RG. The number of the regions RG, and the light sources 160 corresponding to the regions RG, are not limited to the above, but may be increased or decreased.

The light guide plate 150 according to the second embodiment differs from the light guide plate 150 according to the first embodiment in that a greater number of reflective patterns 153 are aligned in the regions RG. According to the second embodiment, light diffusion between the adjacent regions RG in the light guide plate 150 is restricted as compared to the first embodiment, so that in the second embodiment the linearity of the light travelling in the second direction D2 is improved. Thus, as the width w of each region RG in the third direction D3 becomes smaller, the quantity of light passing through the regions RG has a Gaussian distribution and has superior linearity. Because the light has superior linearity, the backlight unit may have a superior local dimming function. Thus, defects caused by light diffusion into adjacent regions RG and differences in light density are reduced.

Figure 5:
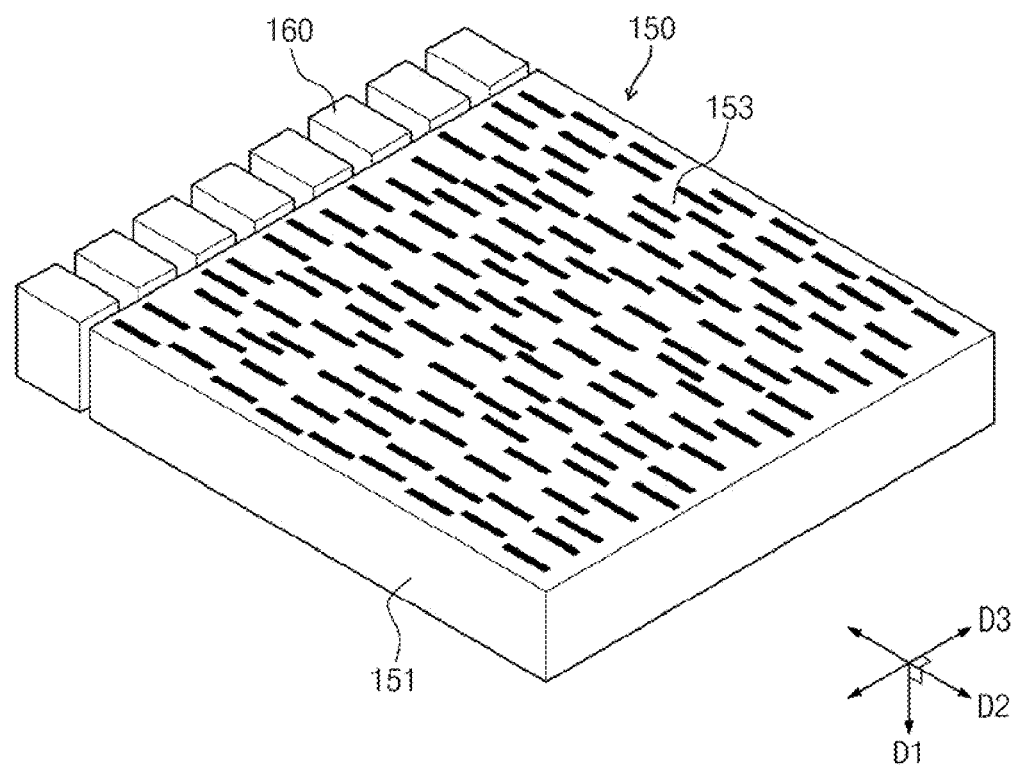
FIG. 5 is a perspective view showing a light guide plate according to a third embodiment.

FIG. 5 is a perspective view showing a light guide plate according to the third embodiment. The third embodiment will be explained by describing the differences between first and third embodiments in order to avoid redundancy. The same reference numerals will be used to designate the same elements.

According to the first embodiment, the light guide plate 150 is divided into a plurality of regions RG and the reflective patterns 153 are formed on the reflective sections RE interposed between the regions RG. However, according to the third embodiment of the present invention, the reflective patterns 153 are randomly formed on all regions RG of the light guide plate 150. The reflective patterns 153 are configured to allow the light incident into the incident surface 151a to be directed in the second direction D2. Therefore, although the reflective patterns 153 according to the third embodiment may have shapes identical to those of the first and second embodiments, the reflective patterns 153 according to the third embodiment are randomly aligned, typically without being sequentially aligned, in the second direction D2.

The alignment of the reflective patterns 153 according to the third embodiment is typically not affected by the driving scheme for the light sources 160 in the edge type local dimming structure. That is, the number of light sources 160 to be driven does not, typically, influence the alignment of the reflective patterns 153. In addition, the alignment of the reflective patterns 153 is typically not affected by the number and size of the regions RG, so the reflective patterns 153 may be formed regardless of the size of the light guide plate 150. For instance, it does not cause a problem even if, for instance, eight light sources 160 or ten light sources 160 are driven to supply light to the incident surface 151a. Therefore, the light guide plate 150 according to the third embodiment may change the number of the light sources 160 for local dimming. Such a change in number of the light sources may also be possible in the second embodiment.

According to the third embodiment, the reflective patterns 153 are randomly aligned on the entire surface of the light guide plate 150. However, according to another embodiment, the density of the reflective patterns 153 may vary depending on the regions RG of the light guide plate 150. That is, when the light guide plate 150 is divided into a plurality of regions RG, the reflective patterns 153 may be densely formed in some regions RG, and the reflective patterns 153 may be more sparsely formed in other regions RG. For instance, when the light guide plate 150 is divided into three sections in the third direction D3, the opposite surface 151c is divided into an incident part adjacent to the incident surface 151a, an opposite part remote from the incident surface 151a, and a center part between the incident part and the opposite part. In this state, the reflective patterns 153 are densely formed in the incident part as compared with the center part, and the reflective patterns 153 are more sparsely formed in the opposite part as compared with the center part. If the density of the reflectively patterns 153 varies depending on the regions RG, the brightness is easily adjusted by controlling the degree of reflection based on quantity of light in each region RG.

Figure 6A:
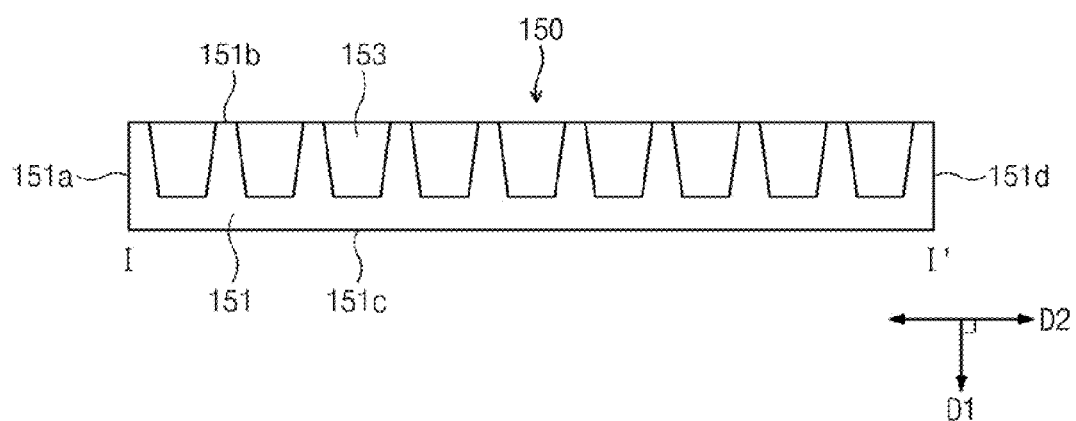
FIGS. 6A to 6C are sectional views showing a light guide plate according to a fourth embodiment to a sixth embodiment.
Figure 6B:
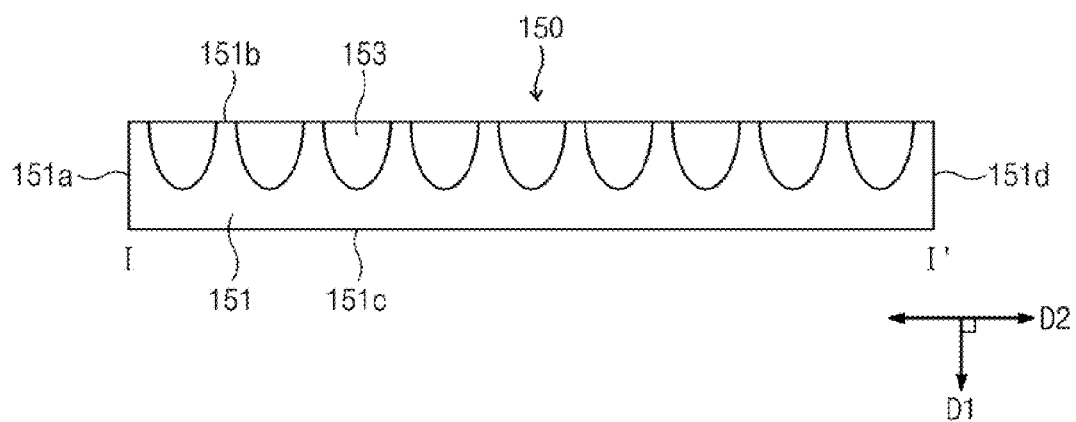
Figure 6C:
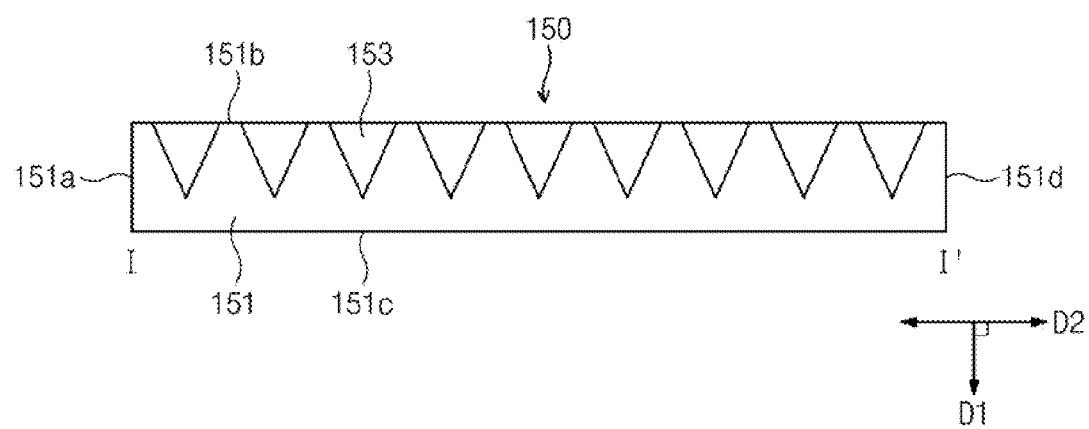

FIGS. 6A to 6C are sectional views showing a light guide plate 150 according to the fourth embodiment to the sixth embodiment of the present invention, respectively. The fourth to the sixth embodiment will be explained by describing the differences between the first and fourth embodiments in order to avoid redundancy. The same reference numerals will be used to designate the same elements. FIGS. 6A to 6C correspond to sectional views taken along line I-I' of FIG. 2.

FIGS. 6A to 6C show the reflective patterns 153 of the light guide plate 150 when viewing in the third direction D3. Each reflective pattern 153 may have a sectional shape of a trapezoid, a semi-oval or a triangle, respectively. The reflective patterns 153 may have various sectional shapes according to the reflective efficiency. According to the fourth embodiment, the sectional area of each reflective pattern 153 of the light guide plate 150 is gradually reduced as each reflective pattern 153 reaches the opposite surface 151c in such a manner that a greater amount of light diffuses to the adjacent regions RG. That is, the length of each reflective pattern 153 in the second direction D2 is greatest at the exit surface 151b, and is gradually reduced along the direction D1 as the reflective pattern 153 becomes closer to the opposite surface 151c. Thus, the quantity of light diffusing between adjacent regions RG may be adjusted, so that bright lines occurring between adjacent regions RG are reduced.

Hereinafter, the characteristics of the light when the light guide plate according to the embodiments of the present invention has been adopted are described.

Figure 7A:
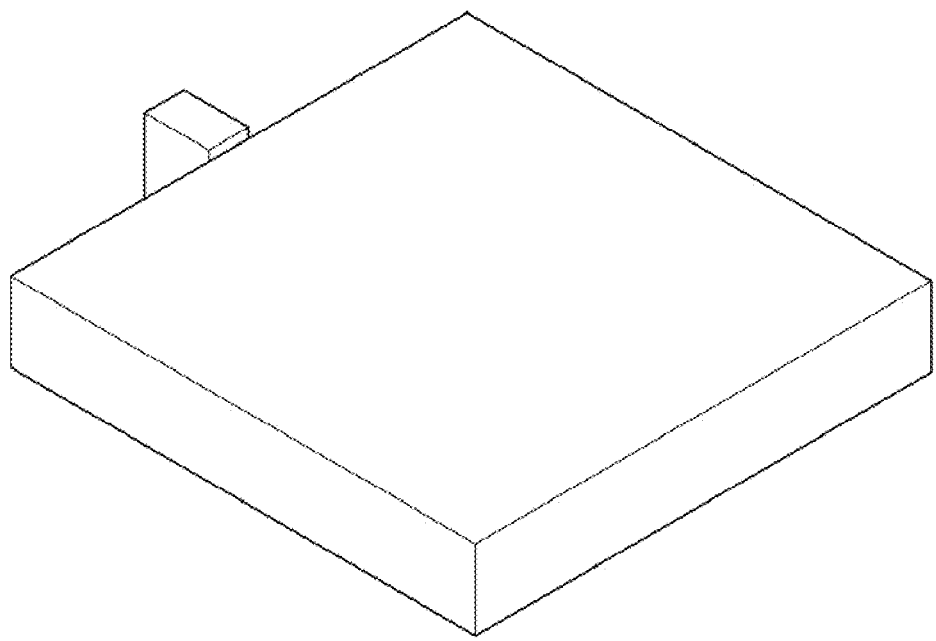
FIGS. 7A to 7C are perspective views showing a conventional light guide plate and two light guide plates according to an embodiment, which are used in experiments to check light characteristics of the light guide plate.
Figure 7B:
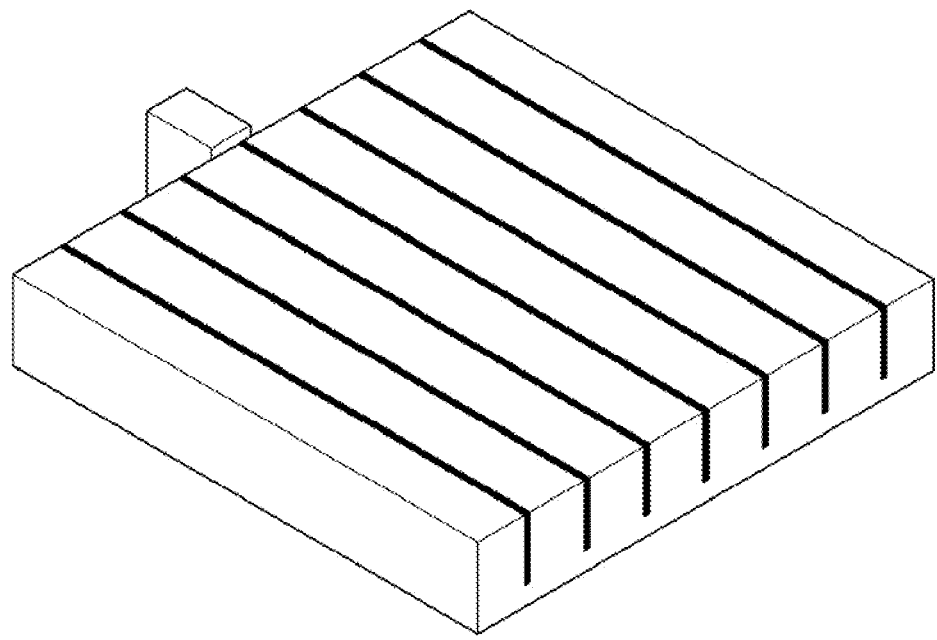
Figure 7C:
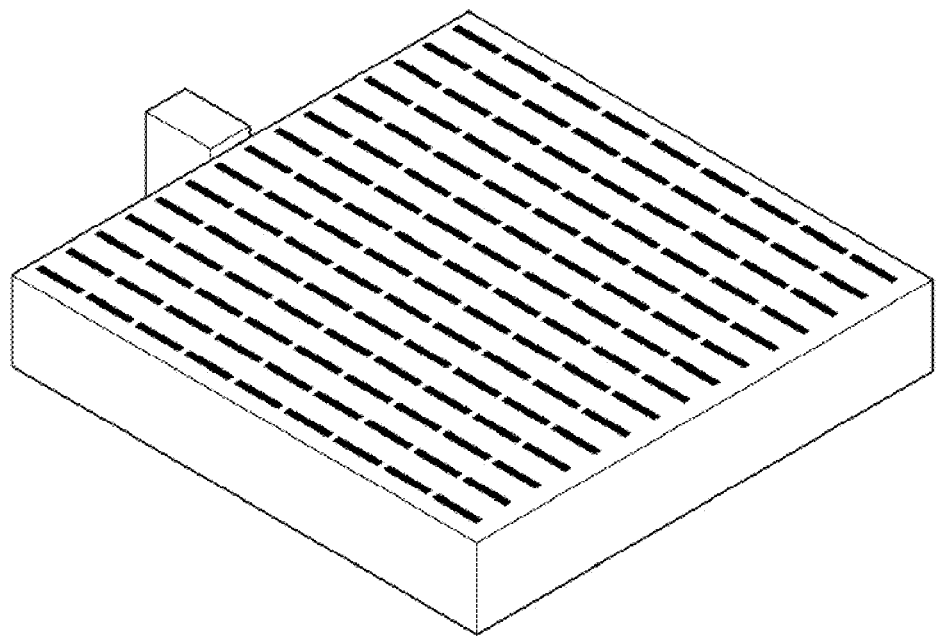

FIGS. 7A to 7C are perspective views showing light guide plates used in experiments to check the light characteristics of the light guide plate according to the embodiments. FIG. 7A shows a conventional light guide plate having no pattern, FIG. 7B shows a light guide plate in which reflective patterns are continuously formed in the second direction from one end to the other end of the light guide plate, and FIG. 7C shows a light guide plate as described with respect to the second embodiment. For these experiments, each light guide plate has the size of 351 mm (length in the second direction)×202 mm (length in the third direction)×1.2 mm (thickness). The light guide plates are divided into first to eighth regions and one light source is aligned in the fifth region.

In FIG. 7B, the depth of the reflective patterns is 0.6 mm, which corresponds to 50% of the thickness of the light guide plate, and a distance between the reflective patterns in the third direction D3 is 7.16 mm.

In FIG. 7C, the depth of the reflective patterns is 0.6 mm, which corresponds to 50% of the thickness of the light guide plate. In addition, the length and width of each reflective pattern are 1 mm and 0.1 mm, respectively. The reflective patterns are spaced apart from each other in the second direction at an interval of 2 mm. When viewing the reflective patterns of FIG. 7C in the second direction D2, the reflective patterns have sectional shapes of an oval as shown in FIG. 6B. In addition, a distance between the reflective patterns in the third direction D3 is 7.16 mm.

Figure 8:
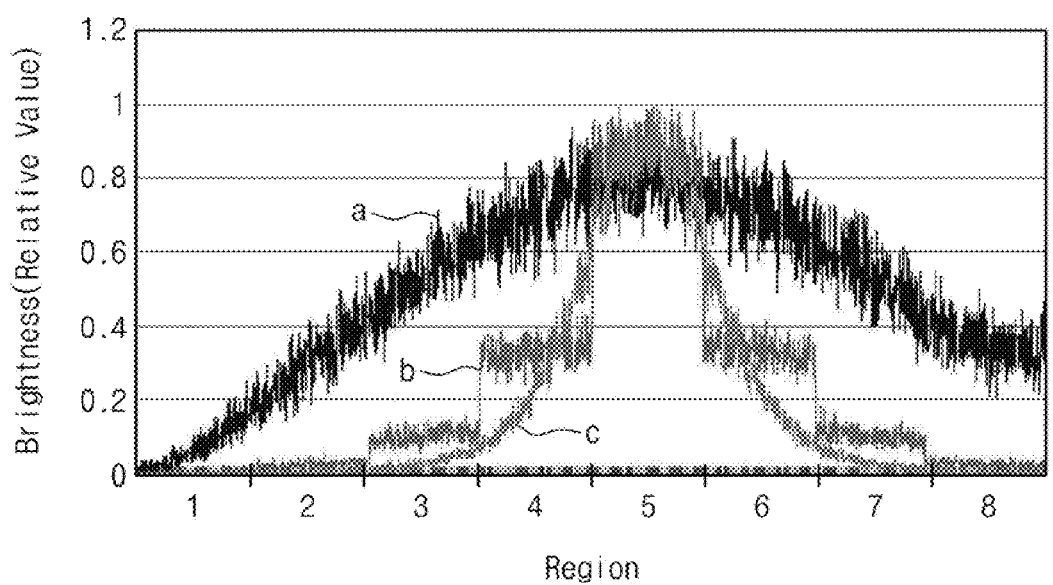
FIG. 8 is a graph showing distributions of light output from the light guide plates shown in FIGS. 7A to 7C, respectively.

FIG. 8 is a graph showing the distribution of light output from the light guide plates shown in FIGS. 7A to 7C. In the graph, "a" represents the light distribution when the light guide plate of FIG. 7A is employed, "b" represents the light distribution when the light guide plate of FIG. 7B is employed, and "c" represents the light distribution when the light guide plate of FIG. 7C is employed. In order to compare the distributions of light travelling in the light guide plates, the simulation is made based upon the distribution of light travelling through the opposite part in the second direction D2, while disregarding the light output through the exit surface.

Referring to FIG. 8, graph "a" shows greater diffusion of light diffusion relative to that of graph "b" and graph "c", so the linearity of the light is low. Graph "b" shows high linearity of light travelling in the light guide plate as compared with graph "a". However, in graph "b", the distribution of the light appears to vary depending on regions, and the light that is output from the fifth region, which corresponds to the light source, and that is output from the region adjacent to the fifth region, is discontinuously distributed. Furthermore, the density of the light that is output from each region is discrete. If the light output from two adjacent regions is discontinuous, as shown in graph "b", significant differences may occur in the light distribution, so differences in the light quantity between two adjacent regions may be discrete. In the case of graph "c", light travelling in the light guide plate has high linearity and represents a Gaussian light distribution, so the defects occurring in graph "b" can be prevented.

In order to determine the function of the light guide plate according to the present invention, the conventional light guide plate shown in FIG. 7A is described compared to the light guide plate shown in FIG. 7C with photographs and graphs, and then one of the light guide plate shown in FIG. B7 is described compared to the light guide plate shown in FIG. 7C with photographs and graphs.

In the light guide plates used in these experiments (as represented by FIGS. 7A to 7C), eight light sources are installed adjacent to the incident surface of the light guide plate. In FIGS. 9A, 10A, 11A, 12A, 13A, 13B, 14A and 14B, each light source is represented by a numbered box. The boxes that are darkly shaded represent light sources that are in an on state, and the boxes that are not shaded represent light sources that are in the off state.

Figure 9A:
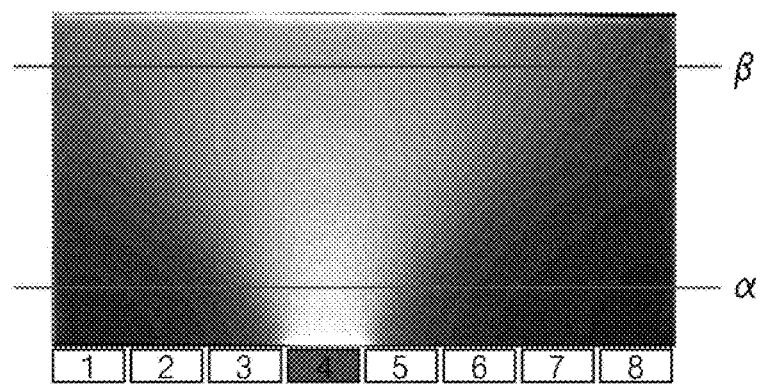
FIG. 9A is a view showing light distribution when using a conventional light guide plate.
Figure 9B:
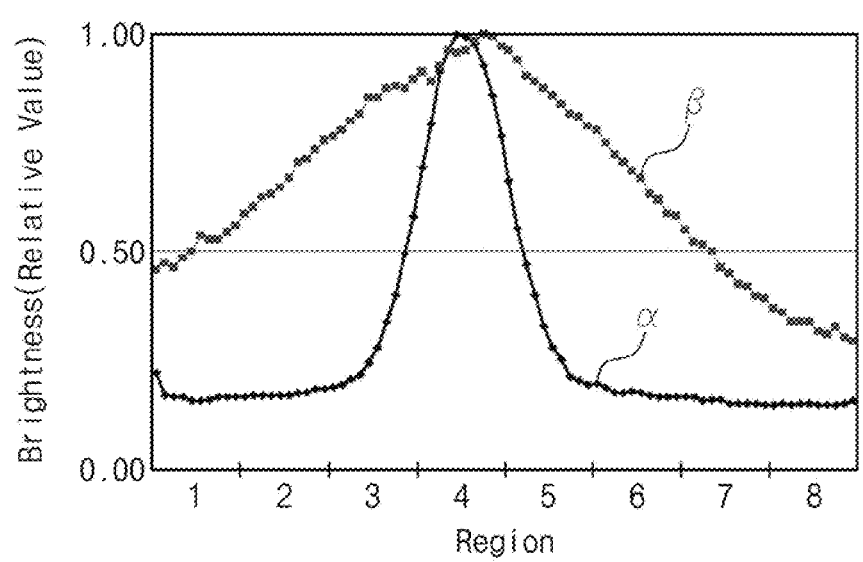
FIG. 9B is a graph showing light distribution according to α and β lines of FIG. 9A.
Figure 10A:
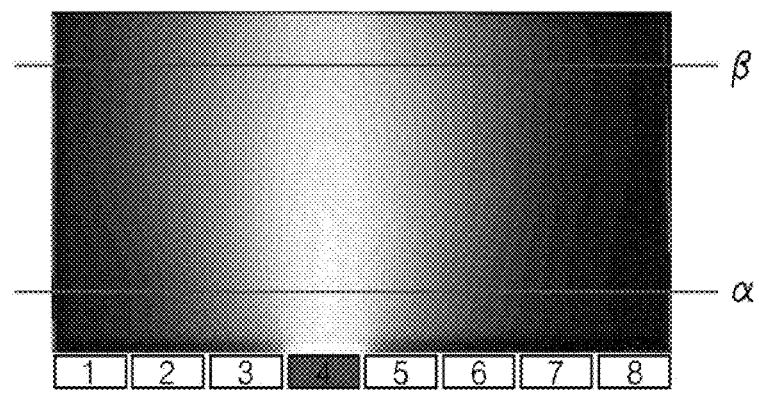
FIG. 10A is a view showing light distribution when using a light guide plate according to an embodiment.
Figure 10B:
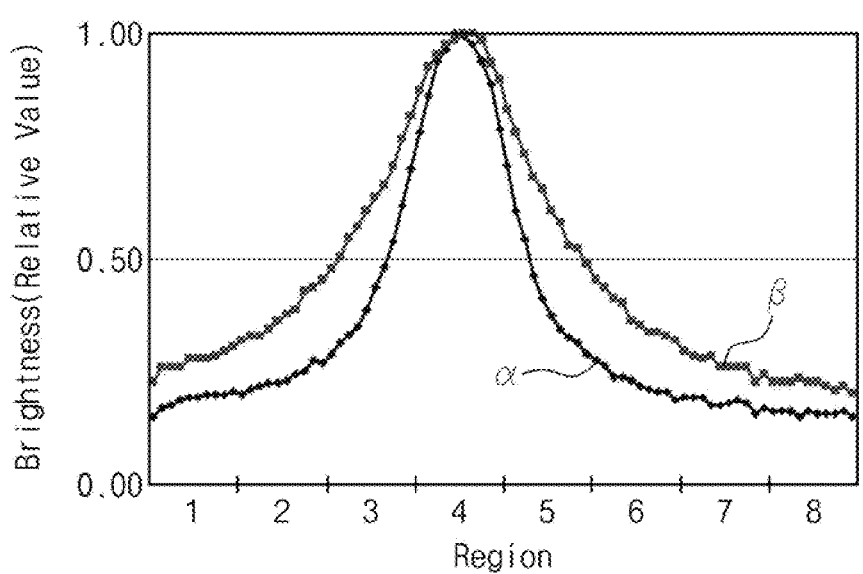
FIG. 10B is a graph showing light distribution according to α and β lines of FIG. 10A.

FIG. 9A is a view showing the light distribution when using the conventional light guide plate shown in FIG. 7A, and FIG. 9B is a graph showing the light distribution per the α and β lines of FIG. 9A. FIG. 10A is a view showing the light distribution when using the light guide plate shown in FIG. 7C, in which the light guide plate is divided into eight regions and light is incident into the fourth region. FIG. 10B is a graph showing light distribution per the α and β lines of FIG. 10A, in which the α and β lines are located in an incident part and an opposite part, respectively.

Referring to FIGS. 9A, 9B, 10A and 10B, the light distribution graph shows that the FWHM (full width at half maximum) of light at the opposite part (at the β line) is increased by about 340% as compared with the FWHM of light at the incident part (at the α line) when the conventional light guide plate is employed. Thus, the light diffuses more and more as the light reaches the opposite part from the incident part, so that local dimming may not be realized. In contrast, when the light guide plate according to the embodiment of the present invention is employed, the FWHM of light at the opposite part (at the β line) is increased by about 58% as compared with FWHM of light at the incident part (at the α line). That is, the light guide plate according to the embodiments improves the linearity of light. Thus, local dimming can be efficiently realized. In addition, since the Gaussian light distribution is present over the whole area of the light guide plate, defects caused by differences in the light density may not occur when the light output from the light guide plate is incident into the display panel.

Figure 11A:
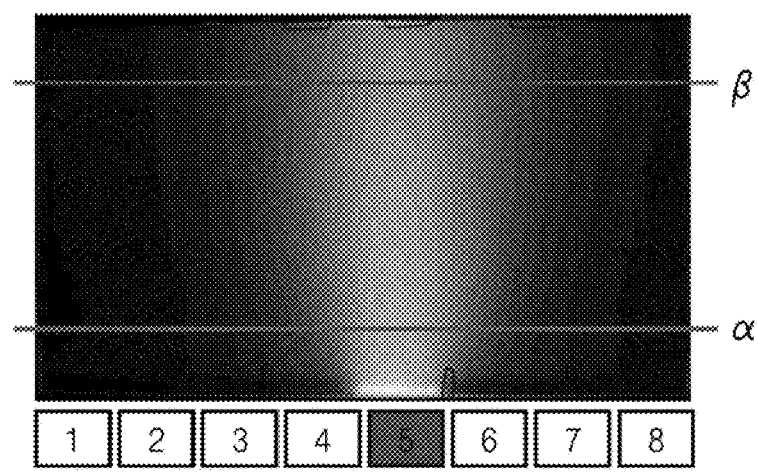
FIG. 11A is a view showing light distribution when using a light guide plate according to an embodiment.
Figure 11B:
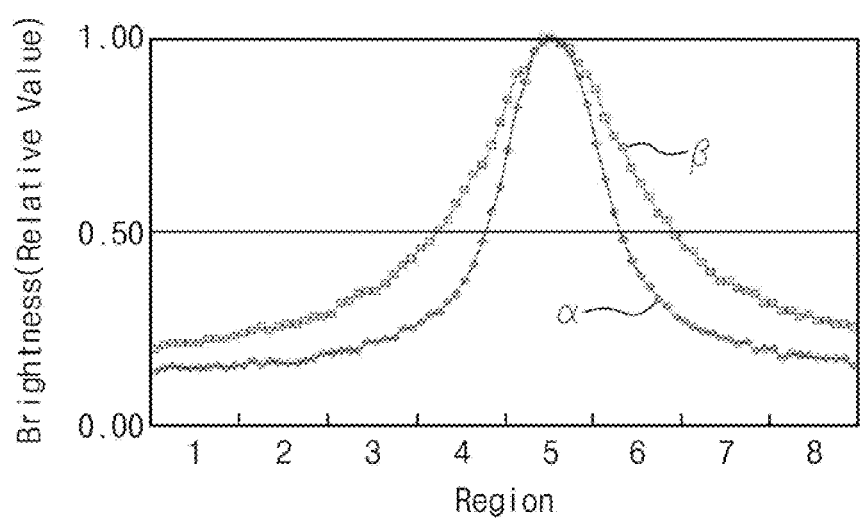
FIG. 11B is a graph showing light distribution according to α and β lines of FIG. 11A.
Figure 12A:
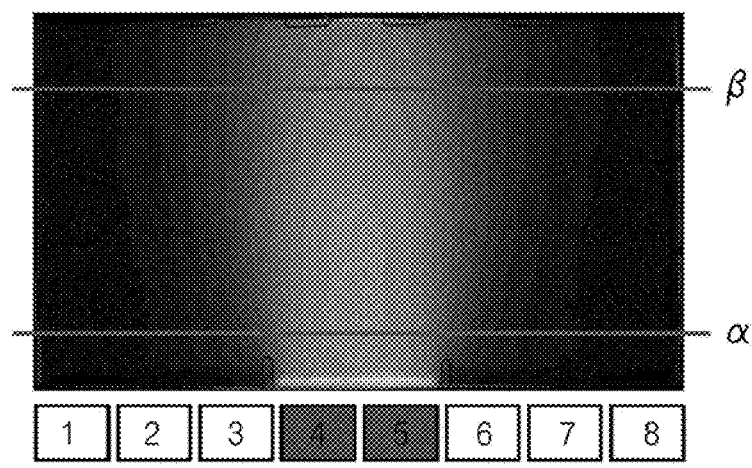
FIG. 12A is a view showing light distribution when using a light guide plate according to an embodiment.
Figure 12B:
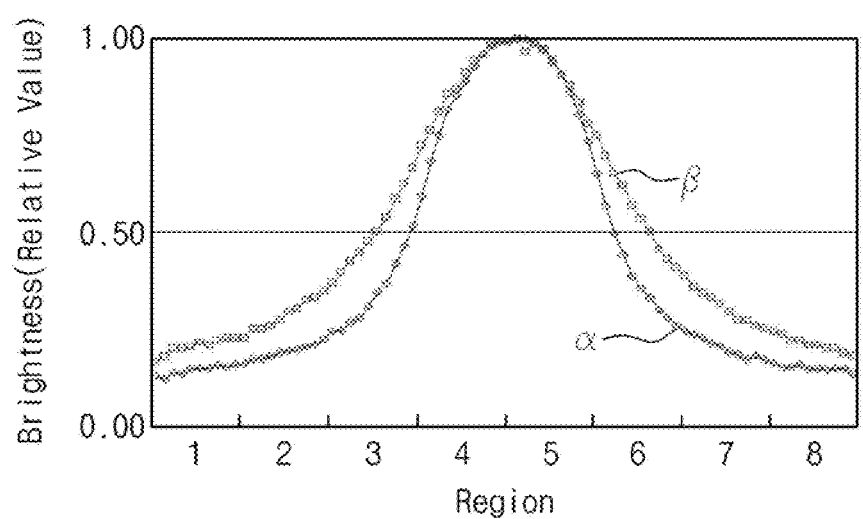
FIG. 12B is a graph showing light distribution according to α and β lines of FIG. 12A.

FIG. 11A is a view showing the light distribution when using the light guide plate shown in FIG. 7C, in which the light guide plate is divided into eight regions and light is incident into the fifth region, and FIG. 11B is a graph showing the light distribution per the α and β lines of FIG. 11A. FIG. 12A is a view showing the light distribution when using the light guide plate shown in FIG. 7C, in which the light guide plate is divided into eight regions and light is incident into the fourth and fifth regions, and FIG. 12B is a graph showing light distribution per the α and β lines of FIG. 12A.

Referring to FIGS. 11A, 11B, 12A and 12B, when the light sources corresponding to each region are driven independently from each other, light is selectively output from specific regions according to the operation of the light sources. The distribution of light output from the specific regions is constantly maintained in the incident part and the opposite part. Even when at least two light sources are simultaneously driven, such light distribution is constantly maintained in the incident part and the opposite part, although the quantity of light may be increased proportionally to the number of light sources.

Figure 13A:
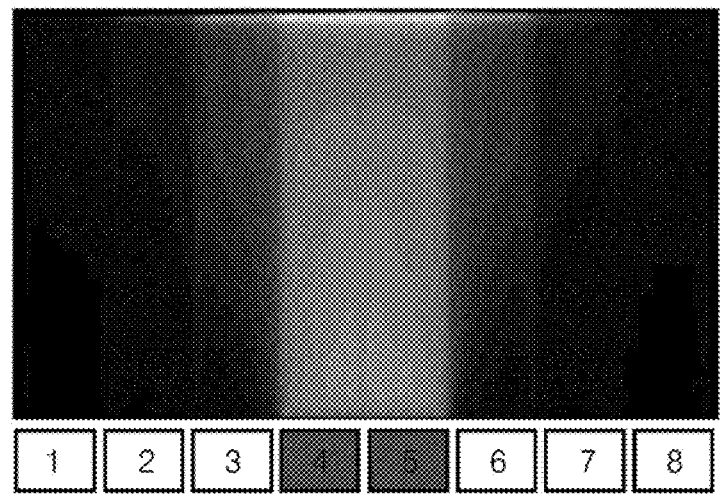
Figure 13B:
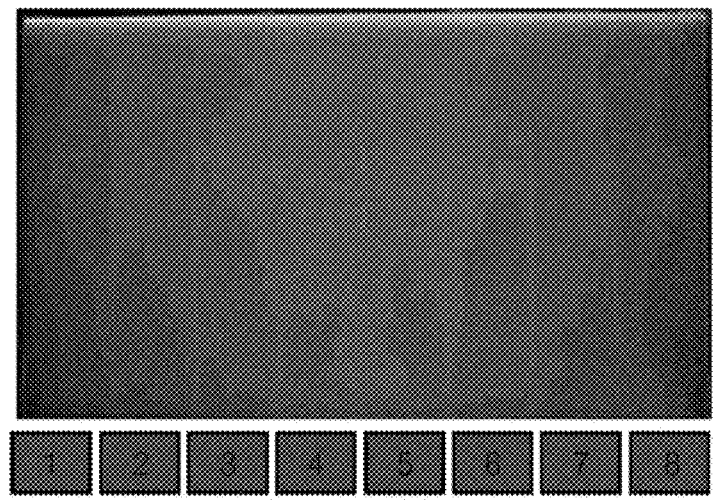

FIG. 13A is a view showing the light distribution of the light guide plate shown in FIG. 7B when some of the plurality of light sources are driven, in which the reflective patterns are continuously formed from one end to the other end of the light guide plate in the second direction, and FIG. 13B is a view showing light distribution of the light guide plate used in FIG. 13A when all of the light sources are driven.

Figure 14A:
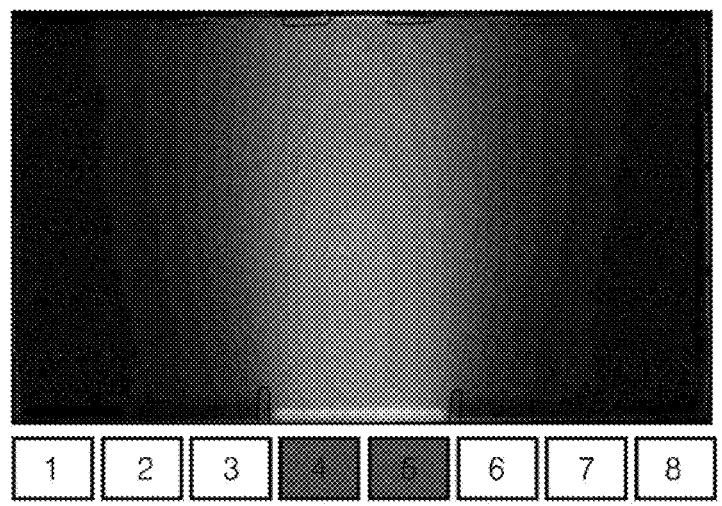
Figure 14B:
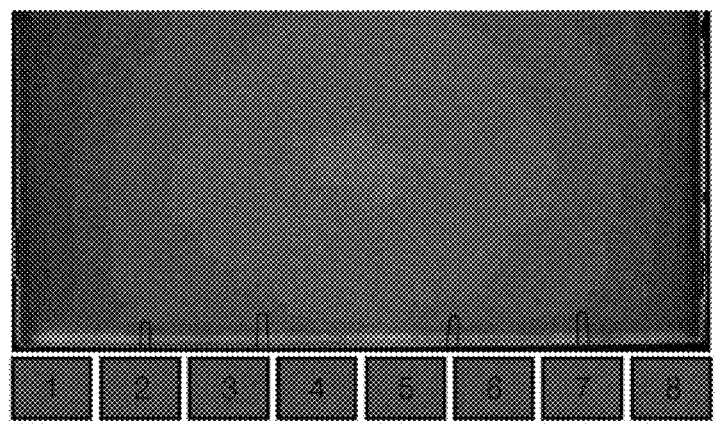
Figure 15:
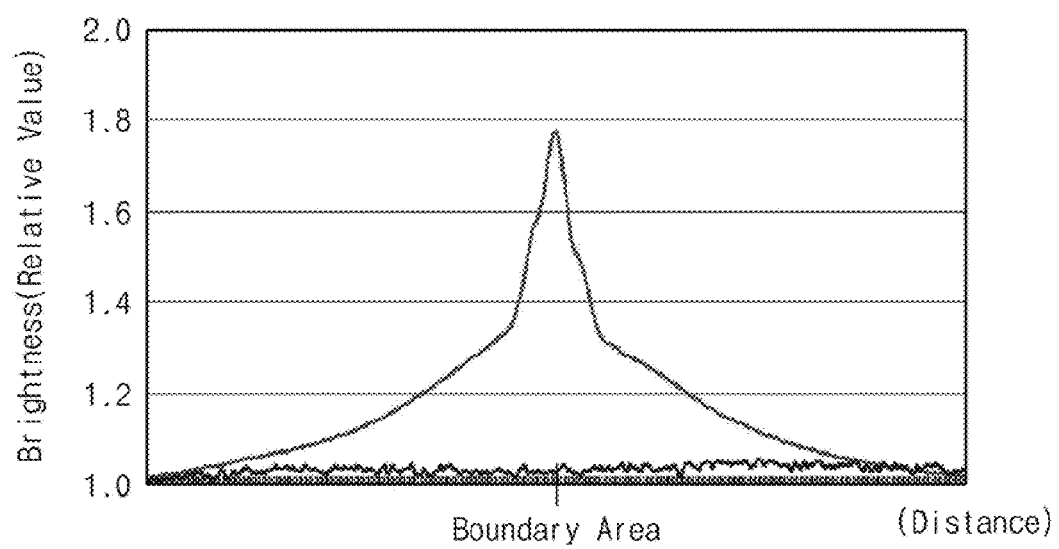
FIG. 15 is a graph showing brightness distributions at a boundary area between regions according to the light guide plate used in FIG. 13A and the light guide plate used in FIG. 14A, respectively.

In addition, FIG. 14A is a view showing the light distribution of the light guide plate shown in FIG. 7C when some of the plurality of light sources are driven, and FIG. 14B is a view showing the light distribution of the light guide plate used in FIG. 14A when all of the light sources are driven. FIG. 15 is a graph showing the brightness distribution at a boundary area between the light guide plate used in FIG. 13A and the light guide plate used in FIG. 14A.

Referring to FIGS. 13A and 13B, when the reflective patterns are continuously formed from one end to the other end of the light guide plate in the second direction, the density of the light is increased at the boundary of each region, so that bight lines may occur. Especially, referring to FIG. 15, the brightness at the boundary area is about 1.78 times the brightness of other regions. This is because reflection continuously occurs in the boundary of each region, so that the density of light in the boundary area is increased. The bright lines are visible to the naked eye even when the light output from the light guide plate is supplied to the display, so the bright lines are regarded as defects.

Referring to FIGS. 14A and 14B, when the light guide plate according to the embodiments is employed, bright lines are not observed at the boundary of each region. Referring to FIG. 15, the brightness at the boundary area is about 1.04 times the brightness of other regions, so brightness variation rarely occurs between the boundary area and other regions. When taking the measurement error into consideration, it appears that the bright lines are completely removed.

As described above, the light guide plate according to the embodiments improves linearity of light incident into the light guide plate, so the light guide plate may advantageously achieve local dimming, which is a technique that is used to change brightness of some regions from among a plurality of regions. In addition, defects such as bright lines can be reduced because the density of the light is continuous between regions. Therefore, the display quality of a display apparatus that includes the light guide plate can be improved.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A light guide plate comprising:
at least one incident surface into which light is incident;
an exit surface through which the light is output, at least one end of the exit surface connected to the incident surface;
an opposite surface opposing the exit surface;
a second surface opposing the incident surface; and
a plurality of reflective patterns, each extending from the exit surface toward the opposite surface,
wherein, when a direction from the exit surface to the opposite surface is referred to as a first direction, a direction perpendicular to the incident surface is referred to as a second direction, and a direction parallel to the incident surface and perpendicular to the first direction is referred to as a third direction, a length of each reflective pattern in the first direction is smaller than a distance between the exit surface and the opposite surface, and a length of each reflective pattern in the second direction is larger than a length of each reflective pattern in the third direction, and
wherein at least one of the reflective patterns is formed in a portion of the light guide plate that is not adjacent to the incident surface and not adjacent to the second surface.

2. The light guide plate of claim 1, wherein the light guide plate comprises a plurality of regions extending in the second direction, and a plurality of reflective sections interposed between the regions, and the reflective patterns are formed on at least one of the reflective sections.

3. The light guide plate of claim 2, wherein a length of each region in the third direction is smaller than the length of each reflective pattern in the first direction.

4. The light guide plate of claim 2, wherein each reflective pattern has a sectional shape of a rhombus, an oval or a rectangle, when each reflective pattern is sectioned along a plane parallel to the exit surface.

5. The light guide plate of claim 4, wherein the length of each reflective pattern in the second direction is gradually reduced along the first direction.

6. The light guide plate of claim 1, wherein the length of each reflective pattern in the first direction is about 10% to about 80% relative to the distance between the exit surface and the opposite surface.

7. The light guide plate of claim 1, wherein the light guide plate is divided into a plurality of sub-regions and a number of the reflective patterns in one sub-region is different from a number of the reflective patterns in at least one of the rest of the sub-regions.

8. A light guide plate comprising:
at least one incident surface into which light is incident;
an exit surface through which the light is output, at least one end of the exit surface connected to the incident surface;
an opposite surface opposing the exit surface; and
a plurality of reflective patterns, each extending from the opposite surface toward the exit surface,
wherein, when a direction from the opposite surface to the exit surface is referred to as a first direction, a direction perpendicular to the incident surface is referred to as a second direction, and a direction parallel to the incident surface and perpendicular to the first direction is referred to as a third direction, a length of each reflective pattern in the first direction is smaller than a distance between the exit surface and the opposite surface, and a length of each reflective pattern in the second direction is larger than a length of each reflective pattern in the third direction and less than half a length of the light guide plate in the second direction.

9. A display apparatus comprising:
a display panel;
a plurality of light sources; and
a light guide plate disposed between the display panel and the light sources to guide light emitted from the light sources to the display panel,
wherein the light guide plate comprises:
at least one incident surface into which the light is incident;
an exit surface through which the light is output, at least one end of the exit surface connected to the incident surface;
an opposite surface opposing the exit surface;
a second surface opposing the incident surface; and
a plurality of reflective patterns, each extending from the exit surface toward the opposite surface,
wherein, when a direction from the exit surface to the opposite surface is referred to as a first direction, a direction perpendicular to the incident surface is referred to as a second direction, and a direction parallel to the incident surface and perpendicular to the first direction is referred to as a third direction, a length of each reflective pattern in the first direction is smaller than a distance between the exit surface and the opposite surface, and a length of each reflective pattern in the second direction is larger than a length of each reflective pattern in the third direction,
wherein at least one of the reflective patterns is formed in a portion of the light guide plate that is not adjacent to the incident surface and not adjacent to the second surface.

10. The display apparatus of claim 9, wherein the light sources are disposed facing the incident surface.

11. The display apparatus of claim 10, wherein the light guide plate is provided with two incident surfaces which are disposed on two sides of the light guide plate, the two incident surfaces are facing each other, and both ends of the exit surface are connected to the two incident surfaces, respectively.

12. The display apparatus of claim 10, wherein the light guide plate comprises a plurality of regions extending in the second direction, and a plurality of reflective sections interposed between the regions, and the reflective patterns are formed on at least one of the reflective sections.

13. The display apparatus of claim 12, wherein a number of the regions is equal to or more than a number of the light sources.

14. The display apparatus of claim 13, wherein the number of the regions is equal to the number of the light sources, and the light sources are provided in one-to-one correspondence to the regions.

15. The display apparatus of claim 12, wherein a length of each region in the third direction is smaller than the length of each reflective pattern in the first direction.

16. The display apparatus of claim 9, wherein each reflective pattern has a sectional shape of a rhombus, an oval or a rectangle, when each reflective pattern is sectioned along a plane parallel to the exit surface.

17. The display apparatus of claim 16, wherein the length of each reflective pattern in the second direction is gradually reduced along the first direction.

18. The display apparatus of claim 9, wherein the length of each reflective pattern in the first direction is about 10% to about 80% relative to the distance between the exit surface and the opposite surface.

19. The display apparatus of claim 9, wherein the light guide plate is divided into a plurality of sub-regions and a number of the reflective patterns in one sub-region is different from a number of the reflective patterns in at least one of the rest of the sub-regions.

* * * * *